United States Patent
Lin et al.

(10) Patent No.: US 7,463,688 B2
(45) Date of Patent: Dec. 9, 2008

(54) METHODS AND APPARATUS FOR REMOVING BLOCKING ARTIFACTS OF MPEG SIGNALS IN REAL-TIME VIDEO RECEPTION

(75) Inventors: Peng Lin, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 602 days.

(21) Appl. No.: 10/345,555

(22) Filed: Jan. 16, 2003

(65) Prior Publication Data

US 2004/0141557 A1  Jul. 22, 2004

(51) Int. Cl.
 *H04B 1/66* (2006.01)
(52) U.S. Cl. .............................. 375/240.18
(58) Field of Classification Search ............ 375/240.18, 375/240.01, 240.25, 240.26, 240.29, 240.17, 375/240.23, 240.15, 240.03; 348/606, 620, 348/416.1, 426.1; 382/253, 268, 275; *H04B 1/66*
See application file for complete search history.

(56) References Cited

U.S. PATENT DOCUMENTS

| 5,367,629 | A | * | 11/1994 | Chu et al. ................... 382/253 |
| 5,512,956 | A | * | 4/1996 | Yan ............................ 348/606 |
| 5,621,467 | A | * | 4/1997 | Chien et al. ............. 375/240.15 |
| 5,761,341 | A | * | 6/1998 | Go .............................. 382/232 |
| 5,850,294 | A | * | 12/1998 | Apostolopoulos et al. ..................... 358/426.14 |
| 5,852,475 | A | * | 12/1998 | Gupta et al. ................. 348/606 |
| 5,920,356 | A | * | 7/1999 | Gupta et al. ................. 348/606 |
| 5,974,196 | A | * | 10/1999 | Chang et al. ................. 382/268 |
| 6,041,145 | A | * | 3/2000 | Hayashi et al. ............. 382/268 |
| 6,088,047 | A | * | 7/2000 | Bose et al. ................... 345/547 |
| 6,178,205 | B1 | * | 1/2001 | Cheung et al. ......... 375/240.29 |
| 6,236,763 | B1 | * | 5/2001 | Wong et al. ................. 382/261 |

(Continued)

FOREIGN PATENT DOCUMENTS

CN   1272286 A   11/2000

(Continued)

OTHER PUBLICATIONS

R. Gopinath, et al., "Wavelet-based Post processing of Low Bit Rate Transform Coded Images," ICIP 1994.

(Continued)

*Primary Examiner*—Tung Vo
(74) *Attorney, Agent, or Firm*—Kenneth L. Sherman, Esq.; Michael Zarrabian, Esq.; Myers Dawes Andras & Sherman, LLP (57) ABSTRACT

A method for efficient removal of blocking artifacts in blocks of pixels forming a video image frame, without blurring image edges. First a current pixel is checked to determine whether it is a block boundary pixel. If the current pixel is a boundary pixel, then the "1-D central variance" is computed for horizontal, vertical and diagonal directions that cross the block boundary by using three pixels along a line centered at the current pixel. The "least central variance direction" is then determined by finding the direction which has minimal "1-D central variance". Then, the current pixel is updated by replacing its value with the average value of the three pixels along the "least central variance direction", to essentially remove undesirable blocking artifacts.

25 Claims, 7 Drawing Sheets

U.S. PATENT DOCUMENTS

| | | | |
|---|---|---|---|
| 6,240,135 B1 * | 5/2001 | Kim | 375/240.01 |
| 6,285,801 B1 * | 9/2001 | Mancuso et al. | 382/268 |
| 6,320,905 B1 * | 11/2001 | Konstantinides | 375/240.08 |
| 6,427,031 B1 | 7/2002 | Price | |
| 6,504,873 B1 * | 1/2003 | Vehvilainen | 375/240.29 |
| 6,529,638 B1 * | 3/2003 | Westerman | 382/275 |
| 6,724,944 B1 * | 4/2004 | Kalevo et al. | 382/268 |
| 6,807,317 B2 * | 10/2004 | Mathew et al. | 382/266 |
| 6,931,063 B2 * | 8/2005 | Sun et al. | 375/240.16 |
| 6,973,221 B1 * | 12/2005 | Xue | 382/268 |
| 6,983,079 B2 * | 1/2006 | Kim | 382/275 |
| 7,120,197 B2 * | 10/2006 | Lin et al. | 375/240.29 |
| 7,203,234 B1 * | 4/2007 | Zeng | 375/240.03 |
| 7,251,276 B2 * | 7/2007 | Lee et al. | 375/240.03 |
| 2003/0044080 A1 * | 3/2003 | Frishman et al. | 382/268 |

FOREIGN PATENT DOCUMENTS

CN   1286575 A   3/2001

OTHER PUBLICATIONS

S. Yang, et al., "Coding Artifacts Removal Using Biased Anisotropic Diffusion," ICIP 1997.

T. Liu, et al., "Adaptive Post-processing Algorithms for Low Bit Video Signals" IEEE Tans. on Image Processing, vol. 4, Jul. 1995.

Y. Yang, et al., "Projection-based Spatially Adaptive Reconstruction of Block-transform Compressed Images," IEEE Trans on Image Processing, vol. 4, Jul. 1995.

* cited by examiner

Vertical
Block Boundary

METHODS AND APPARATUS FOR REMOVING BLOCKING ARTIFACTS OF MPEG SIGNALS IN REAL-TIME VIDEO RECEPTION

FIELD OF THE INVENTION

The present invention relates generally to digital signal processing, and more particularly to post-processing of video signals to remove blocking artifacts resulting from block-based transform coding.

BACKGROUND OF THE INVENTION

The MPEG-2 video compression standard has been successfully adopted in digital TV broadcasting. As with many other popular image and video compression standards, MPEG-2 uses block-based Discrete Cosine Transforms (DCT). The basic approach of this DCT-based image and video compression technique is to subdivide the image into 8×8 blocks of pixels and then individually transform, quantize, and encode each block.

However, this block-based coding technique introduces blocking artifacts between block boundaries because the transform does not take into account the correlation between block boundaries. As high picture quality display technologies emerge rapidly, and TV screens get ever larger, the blocking artifacts are more visible and more annoying.

In order to improve the quality of the received images for display, it is necessary to provide the receiver end with a post-processor to remove blocking artifacts in the decoded video streams. The basic requirements for such types of de-blocking post-processors are removing blocking artifacts, preserving image edges, and being cost-effective (i.e., low-complexity and low-memory requirement).

Many post-processing techniques have been developed for reducing blocking artifacts, such as image adaptive filtering (T. Liu, et al., "Adaptive Post-processing Algorithms for Low Bit Video Signals," IEEE Tans. on Image Processing, vol. 4, July 1995); projection on convex sets (Y. Yang, et al., "Projection-based Spatially Adaptive Reconstruction of Block-transform Compressed Images," IEEE Trans. on Image Processing, vol. 4, July 1995); wavelet de-noising (R. Gopinath, et al., "Wavelet-based Post-processing of Low Bit Rate Transform Coded Images," ICIP 1994); and non-linear diffusion (S. Yang, et al., "Coding Artifacts Removal Using Biased Anisotropic Diffusion," ICIP 1997).

Although such conventional techniques have led to improved image quality, most require either a large amount of computation time or a large amount of memory, and as such, are not suitable for real-time video applications. There is, therefore, a need for a post-processing method and apparatus that are simple and require low-memory, and which can efficiently remove blocking artifacts without blurring image edges. There is also a need for such method and apparatus to have a simple architecture be easy for hardware implementation.

BRIEF SUMMARY OF THE INVENTION

The present invention addresses the above needs. An object of the present invention is to provide a simple, low-complexity, low-memory post-processing method and apparatus for efficient removal of blocking artifacts in block-transform coded videos without blurring image edges. As such, the present invention efficiently combines vertical block boundary processing with horizontal block boundary processing. In an embodiment of a post-processing apparatus (system) according to the present invention a Vertical Block Boundary Processor and a Horizontal Block Boundary Processor are utilized. The Vertical Block Boundary Processor removes vertical blocking artifacts, and the Horizontal Block Boundary Processor removes horizontal blocking artifacts. Each video frame is processed in raster scan order, first by the Vertical Block Boundary Processor and then by the Horizontal Block Boundary Processor. After the Vertical Block Boundary Processor has completed processing one scan line, it passes the whole scan line to the Horizontal Block Boundary Processor. Because the Horizontal Block Boundary Processor only needs three scan lines to process the horizontal block boundary, instead of waiting for the Vertical Block Boundary Processor to finish the entire frame, the Horizontal Block Boundary Processor can start immediately right after it has accumulated the first three scan lines from the output of the Vertical Block Boundary Processor. This provides efficient processing that requires less memory.

In one embodiment, for the above mentioned Vertical Block Boundary Processor and Horizontal Block Boundary Processor, the present invention provides a method of removing blocking artifacts, wherein the current pixel is checked to determine whether it is a vertical/horizontal block boundary pixel. If the current pixel is a vertical/horizontal block boundary pixel, the "1-D central variance" is computed for the horizontal, vertical and diagonal directions that cross the vertical/horizontal block boundary, using three pixels along a line centered at the current pixel. The "least variance direction" is then determined by finding the direction which has minimal "1-D central variance". Then, the current pixel is updated by replacing its value with the average value of the three pixels along the "least variance direction", to essentially remove the undesirable blocking artifacts without blurring image edges.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

As noted above, the present invention provides a apparatus that implements a simple, low-complexity, low-memory post-processing method for efficient removal of blocking artifacts in block-transform coded videos without blurring image edges. As such, the present invention efficiently combines vertical block boundary processing with horizontal block boundary processing. In an embodiment of a post-processing apparatus (system) according to the present invention a Vertical Block Boundary Processor and a Horizontal Block Boundary Processor are utilized. The Vertical Block Boundary Processor removes vertical blocking artifacts, and the Horizontal Block Boundary Processor removes horizontal blocking artifacts. Each video frame is processed in raster scan order, first by the Vertical Block Boundary Processor and then by the Horizontal Block Boundary Processor. After the Vertical Block Boundary Processor has completed processing one scan line, it passes the whole scan line to the Horizontal Block Boundary Processor. Because the Horizontal Block Boundary Processor only needs three scan lines to process the horizontal block boundary, instead of waiting for the Vertical Block Boundary Processor to finish the entire frame, the Horizontal Block Boundary Processor can start immediately right after it has accumulated the first three scan lines from the output of the Vertical Block Boundary Processor. This provides efficient processing that requires less memory.

In one embodiment, for the above mentioned Vertical Block Boundary Processor and Horizontal Block Boundary Processor, the present invention provides a method of removing blocking artifacts, wherein the current pixel is checked to determine whether it is a vertical/horizontal block boundary pixel. If the current pixel is a vertical/horizontal block boundary pixel, the "1-D central variance" is computed for the horizontal, vertical and diagonal directions that cross the vertical/horizontal block boundary, using three pixels along a line centered at the current pixel. The "least variance direction" is then determined by finding the direction which has minimal "1-D central variance". Then, the current pixel is updated by replacing its value with the average value of the three pixels along the "least variance direction", to essentially remove the undesirable blocking artifacts without blurring image edges.

To help understanding, the present invention is described herein using a luminance signal as pixel value. However, such techniques according to the present invention, can also be applied to other image/pixel characteristics values such as e.g. chrominance, etc.

Figure 1A:
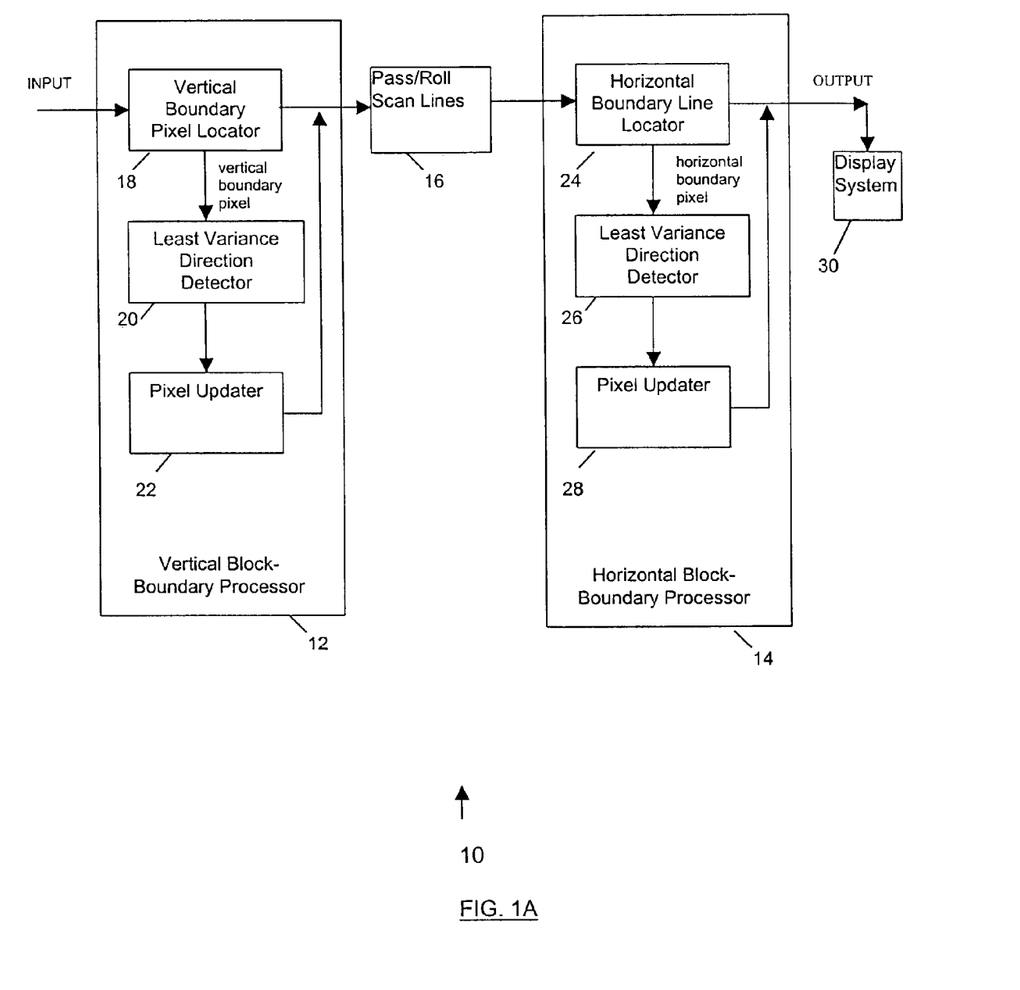
FIG. 1A shows a functional block diagram of an embodiment of a de-blocking system for removing blocking artifacts according to the present invention.

FIG. 1A shows an example block diagram of an embodiment of a de-blocking system 10 for removing blocking artifacts, according to the present invention. The system 10 includes a Vertical Block Boundary Processor (VBBP) 12 that removes vertical blocking artifacts, and a Horizontal Block Boundary Processor (HBBP) 14 that removes horizontal blocking artifacts.

Each video frame is processed in raster scan order (i.e., raster scan lines of pixels). When an input scan line is received, the Vertical Block Boundary Processor 12 processes all the vertical block boundary pixels on this scan line (the block boundaries in a frame are formed as a result of block-based transform coding). After the Vertical Block Boundary Processor 12 has completed processing the pixels on that scan line, it passes the whole scan line to the Horizontal Block Boundary Processor 14.

As with the Vertical Block Boundary Processor 12, the Horizontal Block Boundary Processor 14 uses three scan lines to process the block boundaries. As such, initially, the Horizontal Block Boundary Processor 14 accumulates three scan lines. After the Horizontal Block Boundary Processor 14 receives three scan lines from the Vertical Block Boundary Processor 12, the Horizontal Block Boundary Processor 14 begins processing the middle scan line using the top and bottom scan lines. To process the middle scan line, the Horizontal Block Boundary Processor 14 first determines whether the middle scan line is a horizontal block boundary line. If the middle scan line is not a horizontal block boundary line, the Horizontal Block Boundary Processor 14 bypasses it. However, if the middle scan line is a horizontal block boundary line, then the Horizontal Block Boundary Processor 14 processes each pixel on this scan line to remove the horizontal blocking artifacts.

Figure 2:
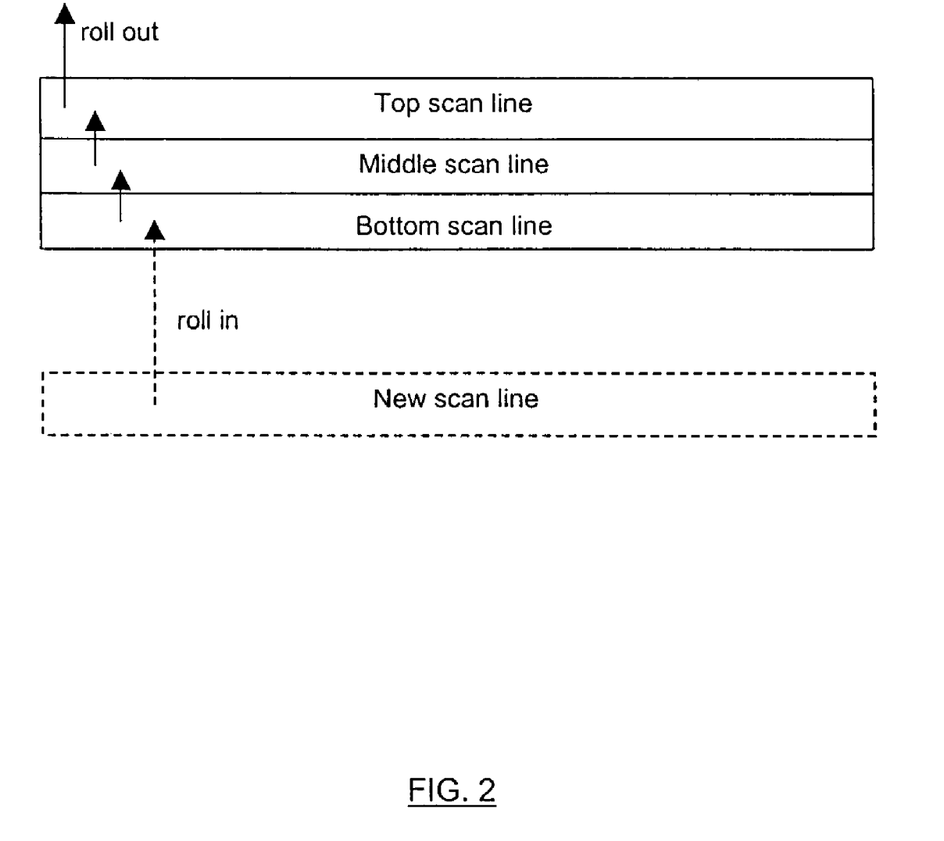
FIG. 2 is a diagram illustrating an example scan line rolling process for the Horizontal Block Boundary Processor of FIG. 1A.

After the Horizontal Block Boundary Processor 14 has completed processing the middle scan line, it "rolls" out the top scan line and "rolls" in a new scan line from the output of the Vertical Block Boundary Processor 12. Referring to the example process flow in FIG. 2, now the old middle scan line becomes the new top scan line, the old bottom scan line becomes the new middle scan line, and the newly received scan line becomes the new bottom scan line. After one rolling of the scan lines, the Horizontal Block Boundary Processor 14 processes the new middle scan line, and so on. The above functions of passing a scan line from the processor 12 to the processor 14, and "rolling" scan lines, can also be implemented in a Pass/Roll block 16 in FIG. 1A.

In one embodiment, the Vertical Block Boundary Processor 12 comprises a Vertical Boundary Pixel Locator 18, a Least Variance Direction Detector 20 and a Pixel Updater 22, operating as described by example below. Now also referring to the example method steps in FIG. 1B, each video frame is first processed in raster scan order (step 40). In one example, the input to the system 10 comprises an MPEG-2 decoded signal. That signal is provided to the Vertical Block Boundary Processor 12 as scan lines of pixels, wherein for each pixel on the current scan line, the Vertical Boundary Pixel Locator 18 first checks the current pixel to determine whether it is a vertical block boundary pixel (step 42).

Figure 1B:
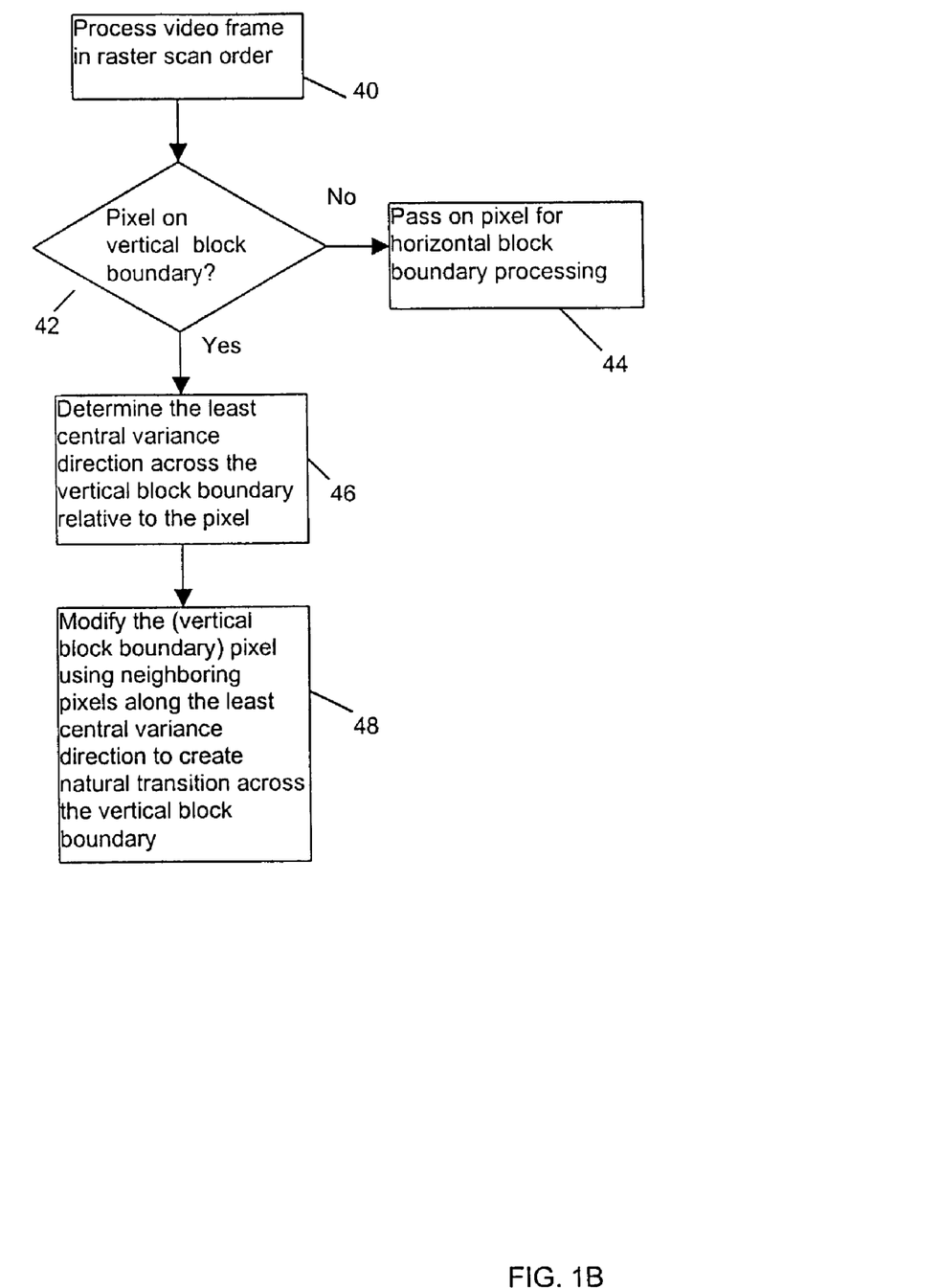
FIGS. 1B-C show flowcharts of steps of an embodiment of a method of removing blocking artifacts according to the present invention.

If the current pixel is not a vertical block boundary pixel, it is passed as the output of the Vertical Block Boundary Processor 12 without modification (step 44). However, if the current pixel is a vertical block boundary pixel, it is passed to the Least Variance Direction Detector 20. The Least Variance Direction Detector 20 determines the "least central variance direction" across the vertical block boundary with respect to the current pixel (step 46). The "least central variance direction" indicates that there are image features, such as e.g. edges, across the block boundary along this direction. Then the Pixel Updater 22 updates (modifies) the characteristic value (e.g., luminance) of the current block boundary pixel using the neighboring pixels along that direction (step 48) to create a natural transition across the block boundary, and therefore essentially removes the blocking artifacts without damaging image edges.

Figure 3:
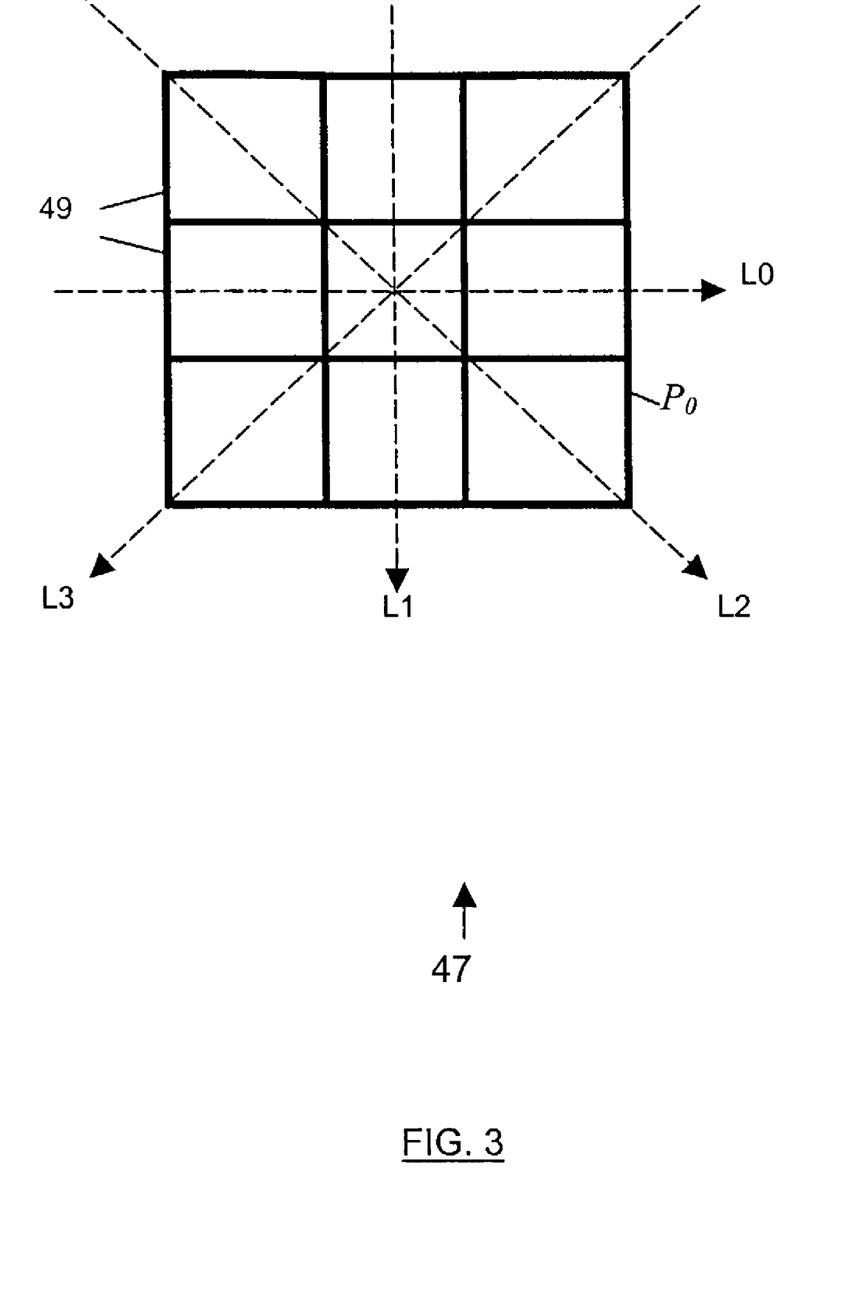
FIG. 3 is a diagram illustrating four example directions for computing 1-D central variance in the system of FIG. 1A.

In order to further explain the operation of the Least Variance Direction Detector 18, the concept of the "1-D central variance" is now described. Referring to the example 3×3 mask (i.e., sub-block) 47 of nine pixels 49 in FIG. 3, for a given pixel, the "1-D central variance" is defined for four directions: (1) horizontal direction L0, (2) vertical direction L1, (3) diagonal direction from upper left corner to lower right L2, and (4) the other diagonal direction L3. In this example, the value (e.g., luminance) of the central pixel $P_0$ in FIG. 3 is denoted by f(m,n), wherein m and n are the row and column indices for the central pixel in the mask 47. Then, $V_0$, $V_1$, $V_2$ and $V_3$, denote the "1-D central variances" for directions L0, L1, L2 and L3, respectively. The "1-D central variance" for pixel at location (m,n) in a block can be defined e.g. as:

$$V_0 = |f(m,n+1) - f(m,n)| + |f(m,n-1) - f(m,n)|,$$

$$V_1 = |f(m+1,n) - f(m,n)| + |f(m-1,n) - f(m,n)|,$$

$$V_2 = |f(m+1,n+1) - f(m,n)| + |f(m-1,n-1) - f(m,n)|,$$

$$V_3 = |f(m-1,n+1) - f(m,n)| + |f(m+1,n-1) - f(m,n)|.$$

Figure 4:
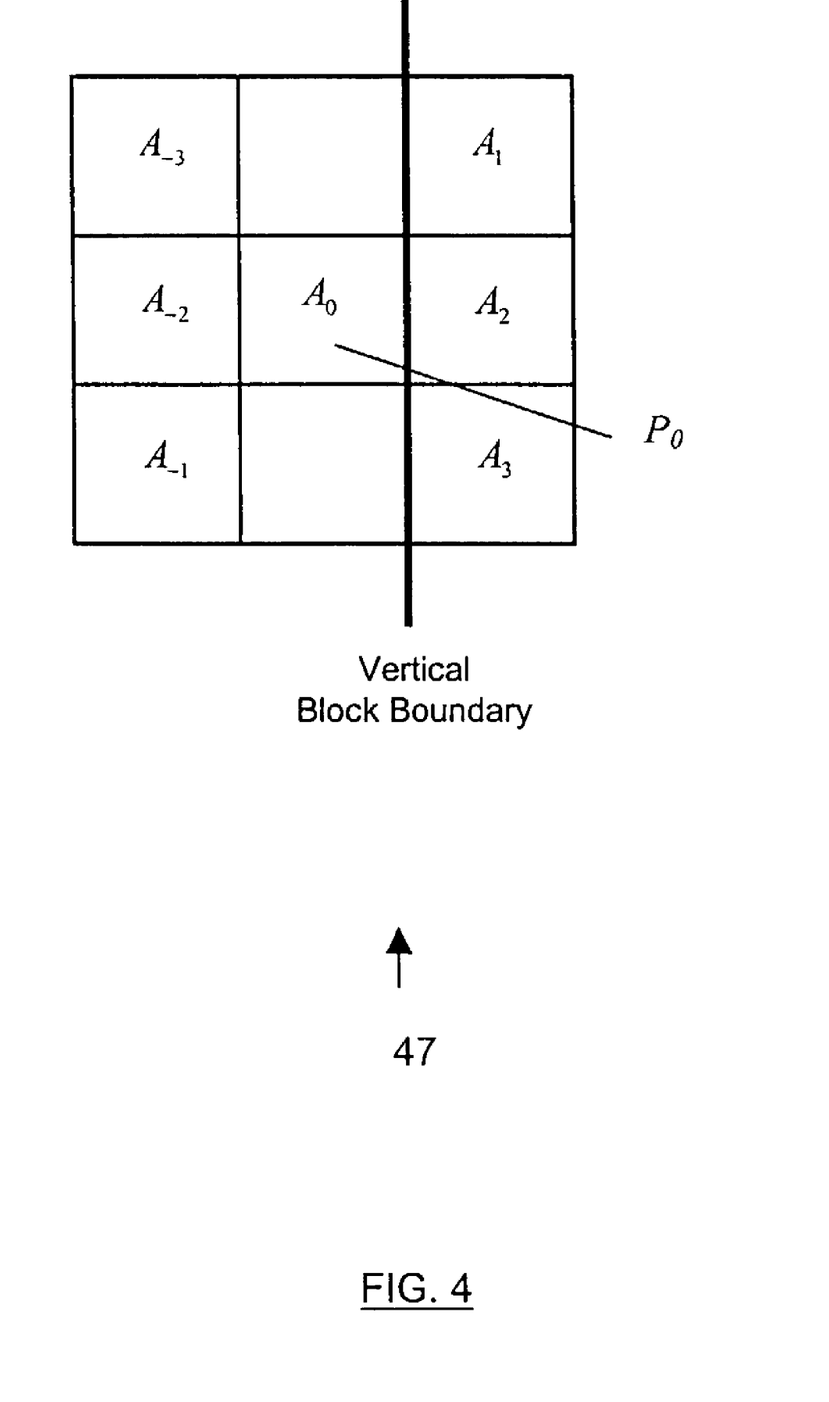
FIG. 4 is a diagram showing an example of the 1-D central variances computation for vertical block boundary pixels.

Referring now to the example 3×3 mask of pixels in FIG. 4, without loss of generality, in this example the current pixel (e.g., $P_0$ in FIG. 2), with the value $A_0$, is a vertical block boundary pixel located at the left side of the vertical block boundary. The values $A_1$, $A_2$, $A_3$, $A_{-1}$, $A_{-2}$ and $A_{-3}$, are for some of the neighboring pixels of the center pixel. In order to determine the "least central variance direction" across the vertical block boundary, the Least Variance Direction Detector 20 first computes the "1-D central variances" along those directions that are across the vertical block boundary. In the example of FIG. 4, in conjunction with FIG. 3, the directions that are across the vertical block boundary are: (1) horizontal direction L0, (2) diagonal direction L2, and (3) the other diagonal direction L3. As such, in one example, the corresponding "1-D central variances" can be computed as:

$$V_0 = |A_2 - A_0| + |A_{-2} - A_0|,$$

$$V_2 = |A_3 - A_0| + |A_{-3} - A_0|,$$

$$V_3 = |A_1 - A_0| + |A_{-1} - A_0|.$$

Next, the minimal value of the above three "1-D central variances" $V_0$, $V_2$ and $V_3$, denoted as min($V_0$, $V_2$, $V_3$), is computed. The corresponding direction of the minimal value of $V_0$, $V_2$ and $V_3$ provides the "least central variance direction". For example, if $V_2$ is the minimal value, then the diagonal direction L2 is the "least central variance direction". If there are multiple minimal values, then in one example, the Least Variance Direction Detector 20 selects the direction among the corresponding directions that has the smallest labeling number as the "least central variance direction".

After the Least Variance Direction Detector 20 has determined the "least central variance direction", it passes the "least central variance direction" to the Pixel Updater 22. As noted above, the Pixel Updater 22 updates the current pixel by using the average of e.g. three pixels along the "least central variance direction". For example, referring to FIG. 4, assuming that the diagonal direction L2 (which is the diagonal direction from the upper left corner to the lower right corner of the mask 47), is the "least central variance direction" determined by the Least Variance Direction Detector 20, then the value $A_0$ of the current pixel is updated by the Pixel Updater 22 as:

$$A_0 = (A_{-3} + A_0 + A_3)/3.$$

After the Pixel Updater 22 has updated the current pixel, it passes the updated pixel to the output of the Vertical Block Boundary Processor 12, and continues to process the next available pixel. When the Vertical Block Boundary Processor 12 completes processing one scan line, it passes the entire scan line to the Horizontal Block Boundary Processor 14 to remove horizontal blocking artifacts.

Referring back to FIG. 1A, in one embodiment, the Horizontal Block Boundary Processor 14 comprises a Horizontal Boundary Line Locator 24, a Least Variance Direction Detector 26 and a Pixel Updater 28, operating as described below.

Figure 1C:
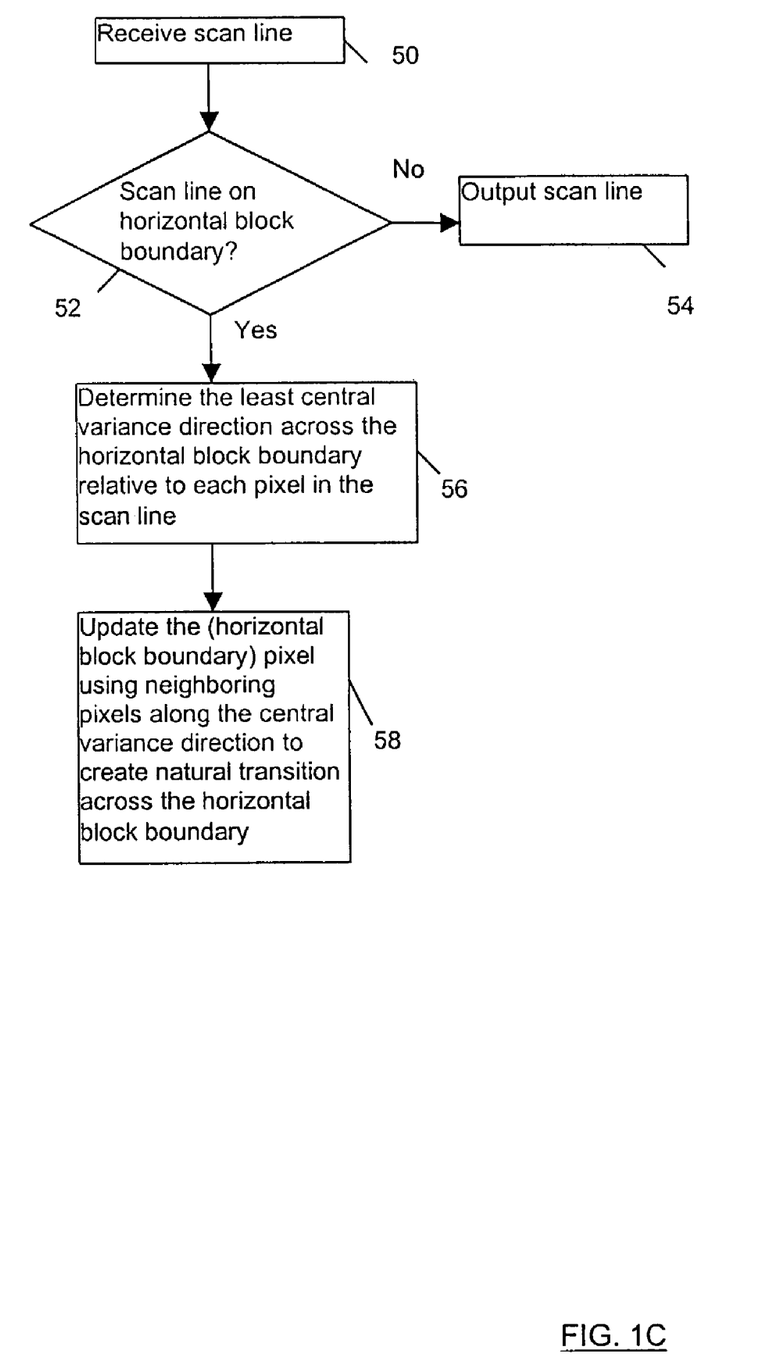

Now also referring to the example method steps in FIG. 1C, the Horizontal Boundary Line Locator 24 uses the output of the Vertical Block Boundary Processor 12 as input (step 50). Unlike the Vertical Boundary Pixel Locator 18 (which checks each pixel on the scan line to determine if it is a vertical boundary pixel), the Horizontal Boundary Line Locator 24 checks each current scan line to determine whether the scan line is a horizontal block boundary line (step 52). If the current scan line is not a horizontal block boundary line, the Horizontal Boundary Line Locator 24 directly passes the whole scan line to the output of the Horizontal Block Boundary Processor 14 without doing any modification (step 54). If the current scan line is a horizontal block boundary line, then the Horizontal Boundary Line Locator 24 passes each pixel of the current scan to the Least Variance Direction Detector 26 to determine the "least central variance direction" across the horizontal block boundary relative to each pixel in the scan line (step 56). Then the Pixel Updater 28 updates each horizontal block boundary pixel using neighboring pixels along the "least central variance direction" to create natural transition across the horizontal block boundary (step 58), therefore essentially removes the blocking artifacts without damaging image edges.

The operations of the example Least Variance Direction Detector 26 and the example Pixel Updater 28, of the Horizontal Block Boundary Processor 14 are now further described. Similar to its counterpart in the Vertical Block Boundary Processor 12, for each pixel of the scan line, the Least Variance Direction Detector 26 determines the "least central variance direction" across the horizontal block boundary with respect to that pixel. In order to determine the "least central variance direction" across the horizontal block boundary, the Least Variance Direction Detector 26 first determines the "1-D central variances" along those directions that are across the horizontal block boundary.

Figure 5:
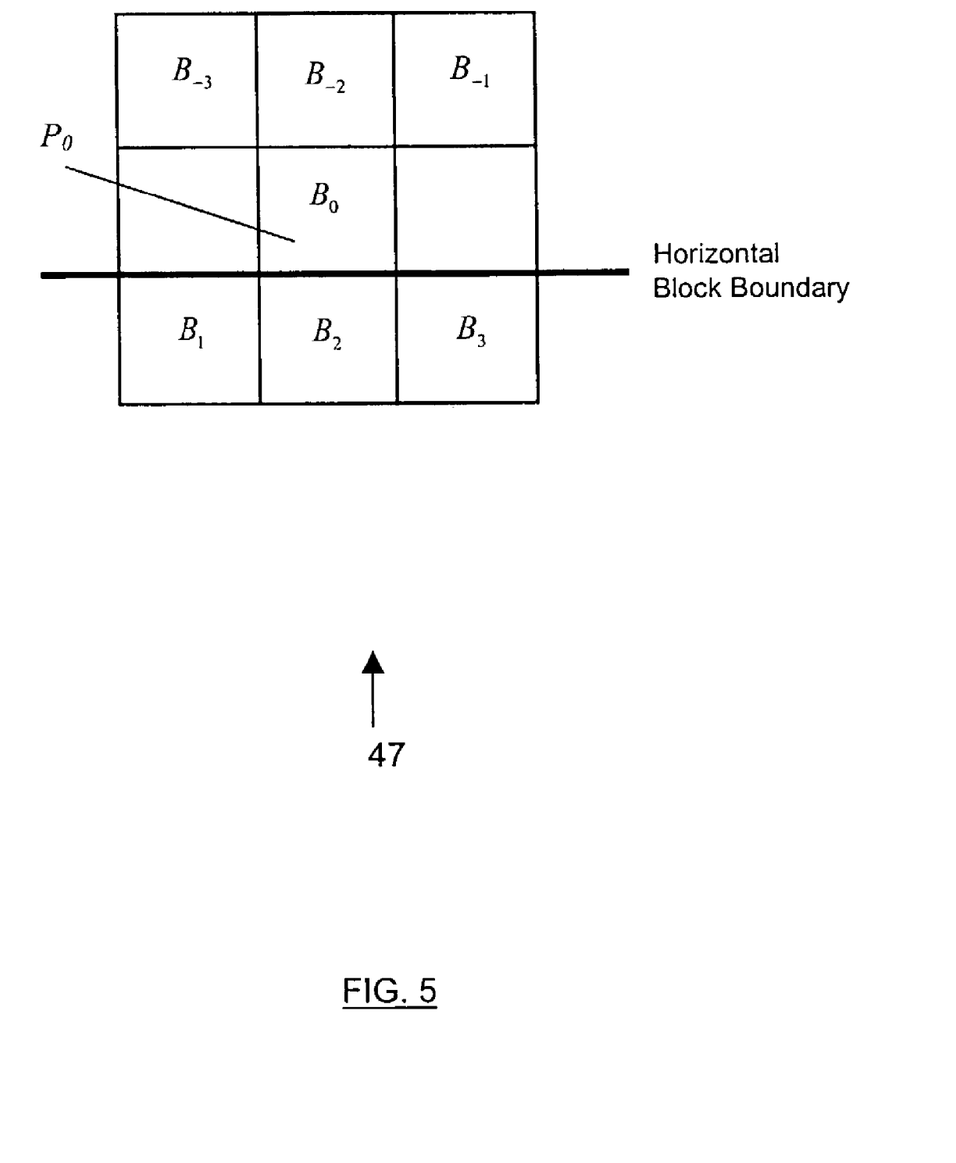
FIG. 5 is a diagram showing an example of the 1-D central variances computation for horizontal block boundary pixels.

Referring to the example 3×3 mask of pixels in FIG. 5, without loss of generality, in this example a current pixel, with value $B_0$, in the scan line is a horizontal block boundary pixel, located at the top side of the horizontal block boundary. Values $B_1$, $B_2$, $B_3$, $B_{-1}$, $B_{-2}$ and $B_{-3}$, are for some of the neighboring pixels of the central pixel. With reference to FIG. 3, the directions that are across the horizontal block boundary in FIG. 5, are: (1) vertical direction L1, (2) diagonal direction L2, and (3) the other diagonal direction L3. The corresponding "1-D central variances" can be computed by example as:

$$V_1 = |B_2 - B_0| + |B_{-2} - B_0|,$$

$$V_2 = |B_3 - B_0| + |B_{-3} - B_0|,$$

$$V_3 = |B_1 - B_0| + |B_{-1} - B_0|.$$

The corresponding direction of the minimal value, min($V_1$, $V_2$, $V_3$), provides the "least central variance direction". For example, if $V_3$ is the minimal value, then the diagonal direction L3 is the "least central variance direction". If there are multiple minimal values, then in one example, the Least Variance Direction Detector 26 selects the direction among the corresponding directions that has the smallest labeling number as the "least central variance direction".

After the Least Variance Direction Detector 26 has determined the "least central variance direction", it passes the "least central variance direction" to the Pixel Updater 28. The Pixel Updater 28 then updates the current pixel by taking the average of e.g. the three pixels along the "least central variance direction". In the example of FIG. 5, assuming that the diagonal direction L3 (which is the diagonal direction from the upper right corner to the lower left corner of the mask), is the "least central variance direction" computed by the Least Variance Direction Detector 26, then the current pixel $B_0$ is updated by the Pixel Updater 28 as:

$$B_0=(B_{-1}+B_0+B_1)/3.$$

After the Pixel Updater 28 has updated the current pixel, it passes the result to the output of the Horizontal Block Boundary Processor 14, which is the final output of the system. Thereafter, the processed image can be displayed on a display system 30.

Therefore, such a de-blocking system according to the present invention, removes blocking artifacts resulting from block-based transform coding by processing block boundary pixels using average of multiple (e.g., three pixels) across the block boundary along the "least central variance direction". The "least central variance direction" is determined by finding the directions across block boundary that has the least "1-D central variance". The "1-D central variance" is computed for four directions, horizontal, vertical, and two diagonal directions, wherein the "1-D central variance" for each direction is computed by taking the sum of the absolute differences between a current pixel and its neighboring pixels (e.g., its two immediate neighboring pixels) along the corresponding direction.

As such, such a system for processing video signals, removes blocking artifacts resulting from block-based transform coding. Use of the Vertical Block Boundary Processor and the Horizontal Block Boundary processor in the system, allows virtually simultaneous and efficient vertical and horizontal block boundary processing of each video frame. This further expedites processing of large volumes of video frames, making the present invention further suitable for real-time video processing applications. Such a de-blocking method and system for removing blocking artifacts, improve image quality without blurring images, and without requiring either a large amount of computation time or a large amount of memory.

The aforementioned apparatus/system according to the present invention, can be implemented as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for processing video image signals to remove blocking artifacts resulting from block-based transform coding in a frame of pixels representing an image, comprising the steps of:

(a) for each pixel in the frame, determining if the pixel is proximate a block boundary resulting from block-based transform coding; and (b) if the pixel is proximate a block boundary, then determining an image feature direction across the block boundary relative to the pixel, and modifying the pixel characteristic value substantially along the image feature direction to create a natural transition across the block boundary to essentially remove blocking artifacts resulting from said block-based transform coding, wherein determining an image feature direction includes determining an image feature direction based on a least central variance direction that is a function of multiple 1-D central variances in multiple directions, respectively, wherein step (b) further includes the steps of:

determining the least central variance direction across the block boundary relative to the pixel as a function of said multiple 1-D central variances, wherein each 1-D central variance in a direction is a function of absolute differences between the pixel and its neighboring pixels along that direction, and then modifying the pixel characteristic value using characteristic values of neighboring pixels substantially along the least central variance direction, to create a natural transition across the block boundary to essentially remove blocking artifacts resulting from said block-based transform coding, wherein the step of determining the least central variance direction across the block boundary relative to the current pixel, further comprises the steps of:

if the horizontal direction is across the block boundary relative to the current pixel, then determining a 1-D central variance in the horizontal direction across the block boundary, using neighboring pixels substantially along a horizontal line centered at the current pixel;

if the vertical direction is across the block boundary relative to the current pixel, then determining a 1-D central variance in the vertical direction across the block boundary, using neighboring pixels substantially along a vertical line centered at the current pixel;

determining 1-D central variances relative to the current pixel in two diagonal directions across the block boundary, using neighboring pixels substantially along two diagonal lines centered at the current pixel, respectively;

selecting the least central variance direction by finding the direction which has minimal 1-D central variance among the 1-D central variances that correspond to the directions across the block boundary;

and then modifying the current pixel characteristic value as a function of the characteristic values of the neighboring pixels along the selected least central variance direction, to create a natural transition across the block boundary to essentially remove blocking artifacts resulting from said block-based transform coding, wherein:

a characteristic value of the current pixel is denoted by f(m,n), wherein m and n are the row and column indices for the current pixel in the frame;

the horizontal 1-D central variance $V_0$ is according to the relation:

$$V_0=|f(m,n+1)-f(m,n)|+|f(m,n-1)-f(m,n)|;$$

the vertical 1-D central variance $V_1$ is according to the relation:

$$V_1=|f(m+1,n)-f(m,n)|+|f(m1,n)-f(m,n)|;\text{and}$$

the diagonal 1-D central variance $V_2$ is according to the relation:

$$V_2=|f(m+1,n1)-f(m,n)|+|f(m1,n-1)-f(m,n)|;\text{and}$$

the other diagonal 1-D central variance $V_3$ is according to the relation:

$$V_3|f(m31\ 1,n+1)-f(m,n)|+|f(m+1,n-1)-f(m,n)|.$$

2. The method of claim 1, further comprising the steps of: before step (a), receiving a signal representing the pixels in the video image frame.

3. A method for processing video image signals to remove blocking artifacts resulting from block-based transform coding in a frame of pixels representing an image, wherein the image is subdivided into blocks of pixels, the method comprising the steps of:
(a) for each pixel in the frame, determining if the pixel is proximate a vertical block boundary of one of the subdivided blocks, wherein each block boundary has a direction;
(b) if the pixel is proximate a vertical block boundary, then determining an image feature direction based on a least central variance direction across the vertical block boundary direction relative to the pixel, and then modifying the pixel characteristic value substantially along the image feature direction to create a natural transition across the vertical block boundary to essentially remove vertical blocking artifacts resulting from said block-based transform coding;
(c) for each pixel in the frame, determining if the pixel is proximate a horizontal block boundary resulting from block-based transform coding; and
(d) if the pixel is proximate a horizontal block boundary, then determining an image feature direction based on a least central variance direction across the horizontal block boundary relative to the pixel, and modifying the pixel characteristic value substantially along the image feature direction to create a natural transition across the horizontal block boundary to essentially remove horizontal blocking artifacts resulting from said block-based transform coding, wherein step (b) further includes the steps of:
if the pixel is proximate a vertical block boundary, determining the least central variance direction as a function of multiple 1-D central variances in multiple directions, respectively, across the vertical block boundary relative to the pixel, and then modifying the pixel characteristic value using characteristic values of neighboring pixels substantially along the least central variance direction, to create a natural transition across the vertical block boundary to essentially remove vertical blocking artifacts resulting from said block-based transform coding;
wherein each 1-D central variance in a direction is a function of differences between the pixel and its neighboring pixels along that direction, wherein the step of determining the least central variance direction across the vertical block boundary relative to the current pixel, further comprises the steps of:
determining a 1-D central variance in the horizontal direction across the vertical block boundary, using neighboring pixels substantially along a horizontal line centered at the current pixel;
determining 1-D central variances in two diagonal directions across the vertical block boundary, using neighboring pixels substantially along two diagonal lines centered at the current pixel, respectively;
selecting the least central variance direction by finding the direction which has minimal 1-D central variance among the horizontal and the two diagonal 1-D central variances;
and then modifying the current pixel characteristic value as a function of the characteristic values of the neighboring pixels along the selected least central variance direction, to create a natural transition across the vertical block boundary to essentially remove vertical blocking artifacts resulting from said block-based transform coding, wherein:
a characteristic value of the current pixel is denoted by $f(m,n)$ wherein m and n are the row and column indices for the current pixel in the frame;

the horizontal 1-D central variance $V_0$ is according to the relation:

$$V_0=|f(m,n+1)-f(m,n)||f(m,n-1)-f(m,n)|;$$

the diagonal 1-D central variance $V_2$ is according to the relation:

$$V_2=|f(m+1,n+1)-f(m,n)|+|f(m-1,n-1)-f(m,n)|;$$

the other diagonal 1-D central variance $V_3$ is according to the relation:

$$V_3=|f(m-1,n+1)-f(m,n)|+|f(m1,n-1)-f(m,n)|.$$

4. The method of claim 3, wherein in step (b) determining an image feature direction based on a least central variance direction across the vertical block boundary direction relative to the pixel, further includes the step of: determining if the image feature direction crosses a block boundary direction, and then modifying the pixel characteristic value substantially along the image feature direction across the block boundary direction, to create a natural transition across the vertical block boundary to essentially remove vertical blocking artifacts resulting from said block-based transform coding.

5. The method of claim 3, wherein step (b) further includes the steps of:
if the pixel is proximate a vertical block boundary, determining the least central variance direction as a function of multiple 1-D central variances in multiple directions, respectively, across the vertical block boundary relative to the pixel, and then modifying the pixel characteristic value to create a natural transition across the vertical block boundary substantially along the least central variance direction, to essentially remove vertical blocking artifacts resulting from said block-based transform coding.

6. The method of claim 3, further comprising the steps of:
before step (a), receiving a signal representing the pixels in the video image frame.

7. The method of claim 3, wherein step (d) further includes the steps of:
if the pixel is proximate a horizontal block boundary, determining the least central variance direction as a function of multiple 1-D central variances in multiple directions, respectively, across the horizontal block boundary relative to the pixel, and then modifying the pixel characteristic value using characteristic values of neighboring pixels substantially along the least central variance direction, to create a natural transition across the horizontal block boundary to essentially remove horizontal blocking artifacts resulting from said block-based transform coding;
wherein each 1-D central variance in a direction is a function of absolute differences between the pixel and its neighboring pixels along that direction.

8. The method of claim 3, further comprising the steps of:
before step (a), receiving a signal representing the pixels in the video image frame.

9. The method of claim 3 wherein each 1-D central variance in a direction is a function of absolute differences between the pixel and its neighboring pixels along that direction.

10. The method of claim 3 wherein:
in step (b) modifying the pixel characteristic value further includes the steps of modifying the pixel characteristic value using characteristic values of neighboring pixels substantially along the image feature direction; and in step (d) modifying the pixel characteristic value further includes the steps of modifying the pixel characteristic value using characteristic values of neighboring pixels substantially along the image feature direction.

11. The method of claim 3 wherein:
in step (b) determining an image feature direction further includes the steps of determining an edge direction across the block boundary relative to the pixel; and
in step (d) determining an image feature direction further includes the steps of determining an edge direction across the block boundary relative to the pixel.

12. The method of claim 11 wherein:
in step (b) modifying the pixel characteristic value further includes the steps of modifying the pixel characteristic value along the edge direction; and
in step (d) modifying the pixel characteristic value further includes the steps of modifying the pixel characteristic value along the edge direction.

13. The method of claim 12, wherein:
in step (b) modifying the pixel characteristic value further includes the steps of modifying the pixel characteristic value using characteristic values of neighboring pixels substantially along the edge direction; and
in step (d) modifying the pixel characteristic value further includes the steps of modifying the pixel characteristic value using characteristic values of neighboring pixels substantially along the edge direction.

14. An apparatus for processing video image signals to remove blocking artifacts resulting from block-based transform coding in a frame of pixels representing an image, wherein the image is subdivided into blocks of pixels, the apparatus comprising:
a vertical block boundary processor that for each pixel in the frame, determines if the pixel is proximate a vertical block boundary resulting from subdividing the image into blocks of pixels in the block-based transform coding, wherein each block boundary has a direction, and if the pixel is proximate a vertical block boundary, then determines a first direction indicating an image feature direction based on a least central variance direction across the vertical block boundary direction relative to the pixel, and then modifies the pixel characteristic value substantially along the image feature direction to create a natural transition across the vertical block boundary to essentially remove vertical blocking artifacts resulting from said block-based transform coding; and
a horizontal block boundary processor that for each pixel in the frame, determines if the pixel is proximate a horizontal block boundary resulting from block-based transform coding, and if the pixel is proximate a horizontal block boundary, then determines an image feature direction based on a least central variance direction across the horizontal block boundary relative to the pixel, and modifies the pixel characteristic value substantially along the image feature direction to create a natural transition across the horizontal block boundary to essentially remove blocking artifacts resulting from said block-based transform coding, wherein the vertical block boundary processor comprises:
a vertical boundary pixel locator that determines if a pixel is proximate a vertical block boundary;
a least variance direction detector that determines the least central variance direction as a function of multiple 1-D central variances in multiple directions, respectively, across the vertical block boundary relative to the pixel, wherein each 1-D central variance in a direction is a function of differences between the pixel and its neighboring pixels along that direction; and
a pixel updater that modifies the characteristic value of the pixel proximate the vertical boundary using characteristic values of neighboring pixels substantially along the least central variance direction, to create a natural transition across the vertical block boundary to essentially remove vertical blocking artifacts resulting from said block-based transform coding, wherein:
the least variance direction detector: (i) determines a 1-D central variance in the horizontal direction across the vertical block boundary, using neighboring pixels substantially along a horizontal line centered at the current pixel; (ii) determines 1-D central variances in two diagonal directions across the vertical block boundary, using neighboring pixels substantially along two diagonal lines centered at the current pixel, respectively; and (iii) selects the least central variance direction by finding the direction which has minimal 1-D central variance among the horizontal and the two diagonal 1-D central variances; and
the pixel updater modifies the current pixel characteristic value as a function of the characteristic values of the neighboring pixels along the selected least central variance direction, to create a natural transition across the vertical block boundary to essentially remove blocking artifacts resulting from said block-based transform coding, wherein:
a characteristic value of the current pixel is denoted by f(m,n), wherein m and n are the row and column indices for the current pixel in the frame;
the horizontal 1-D central variance $V_0$ is according to the relation:
the diagonal 1-D central variance $V_2$ is according to the relation:

$$V_2=|f(m1,+n+1)-f(m,n)|+|f(m-1,n-1)-f(m,n)|; \text{and}$$

the other diagonal 1-D central variance $V_3$ is according to the relation:

$$V_3=|f(m-1,n+1)f(m,n)|+|f(m+1,n-1)-f(m,n)|.$$

15. The apparatus of claim 14, wherein the horizontal block boundary processor comprises:
a horizontal boundary line locator that determines if a line of pixels is proximate a horizontal block boundary;
a least variance direction detector that determines the least central variance direction as a function of multiple 1-D central variances in multiple directions, respectively, across the horizontal block boundary relative to a pixel proximate the horizontal block boundary, wherein each 1-D central variance in a direction is a function of differences between the pixel and its neighboring pixels along that direction;
a pixel updater that modifies the characteristic value of the pixel proximate the horizontal block boundary using characteristic values of neighboring pixels substantially along the least central variance direction, to create a natural transition across the horizontal block boundary to essentially remove horizontal blocking artifacts resulting from said block-based transform coding.

16. The apparatus of claim 15, wherein:
the least variance direction detector: (ii) determines a 1-D central variance in the vertical direction across the horizontal block boundary, using neighboring pixels substantially along a vertical line centered at the current pixel; (ii) determines 1-D central variances in two diagonal directions across the horizontal block boundary, using neighboring pixels substantially along two diagonal lines centered at the current pixel, respectively; and (iii) selects the least central variance direction by finding the direction which has minimal 1-D central variance among the vertical and the two diagonal 1-D central variances; and the pixel updater modifies the current pixel characteristic value as a function of the characteristic values of the neighboring pixels along the selected least central variance direction, to create a natural transition across the horizontal block boundary to essentially remove horizontal blocking artifacts resulting from said block-based transform coding.

17. An apparatus according to claim 14, wherein the apparatus for processing video image signals is a component of an audio-visual system.

18. The apparatus of claim 14, wherein the image feature comprises an edge.

19. The apparatus of claim 14, wherein each video frame is processed in raster scan order, first by the vertical block boundary processor and then by the horizontal block boundary processor such that after the vertical block boundary processor has completed processing one scan line, it passes the entire scan line to the horizontal block boundary processor.

20. An apparatus for processing video image signals to remove blocking artifacts resulting from block-based transform coding in a frame of pixels representing an image, wherein the image is subdivided into blocks of pixels, comprising:

vertical block boundary processor that receives a signal representing the pixels in the video image frame in raster scan order as lines of pixels, wherein for each pixel in a scan line, the vertical block boundary processor determines if the pixel is proximate a vertical block boundary resulting from subdividing the image into blocks of pixels in the block-based transform coding, each block boundary having a direction, and if the pixel is proximate a vertical block boundary, then modifies the pixel characteristic value along a least central variance direction across the vertical block boundary direction relative to the pixel, to create a natural transition across the vertical block boundary to essentially remove vertical blocking artifacts resulting from said block-based transform coding; and a horizontal block boundary processor that receives scan lines of pixel from the vertical block boundary processor, wherein the horizontal block boundary processor determines if a scan line is at a horizontal block boundary resulting from block-based transform coding, and if so, for each pixel in that scan line, the horizontal block boundary processor modifies the pixel characteristic value along a least central variance direction across the horizontal block boundary relative to the pixel, to create a natural transition across the horizontal block boundary to essentially remove horizontal blocking artifacts resulting from said block-based transform coding, wherein the vertical block boundary processor comprises:

a vertical boundary pixel locator that determines if a pixel is proximate a vertical block boundary;

a least variance direction detector that determines the least central variance direction as a function of multiple 1-D central variances in multiple directions, respectively, across the vertical block boundary relative to the pixel, wherein each 1-D central variance in a direction is a function of differences between the pixel and its neighboring pixels along that direction; and a pixel updater that modifies the characteristic value of the pixel proximate the vertical boundary using characteristic values of neighboring pixels substantially along the least central variance direction, to create a natural transition across the vertical block boundary to essentially remove blocking artifacts resulting from said block-based transform coding, wherein:

the least variance direction detector: (i) determines 1-D central variance in the horizontal direction across the vertical block boundary, using neighboring pixels substantially along a horizontal line centered at the current pixel; (ii) determines 1-D central variances in two diagonal directions across the vertical block boundary, using neighboring pixels substantially along two diagonal lines centered at the current pixel, respectively; and (iii) selects the least central variance direction by finding the direction which has minimal 1-D central variance among the horizontal and the two diagonal 1-D central variances; and the pixel updater modifies the current pixel characteristic value as a function of the characteristic values of the neighboring pixels along the selected least central variance direction, to create a natural transition across the vertical block boundary to essentially remove vertical blocking artifacts resulting from said block-based transform coding, wherein:

a characteristic value of the current pixel is denoted by $f(m,n)$, wherein m and n are the row and column indices for the current pixel in the frame;

the horizontal 1-D central variance $V_0$ is according to the relation:

$$V_0 = |f(m,n+1) - f(m,n)| + |f(m,n-1) - f(m,n)|;$$

the diagonal 1-D central variance $V_2$ is according to the relation:

$$V_2 = |f(m+1,n32\ 1) - f(m,n)| + |f(m-1,n-1) - f(m,n)|;\text{ and}$$

the diagonal 1-D central variance $V_3$ is according to the relation:

$$V_3 = |f(m-1,n+1) - f(m,n)| + |f(m+1,n-1) - f(m,n)|.$$

21. An apparatus according to claim 20, wherein the apparatus for processing video image signals is a component of an audio-visual system.

22. The apparatus of claim 20, wherein the horizontal block boundary processor comprises:

a horizontal boundary line locator that determines if a scan line is proximate a horizontal block boundary;

a least variance direction detector that determines the least central variance direction as a function of multiple 1-D central variances in multiple directions, respectively, across the horizontal block boundary relative to a pixel in a scan line proximate horizontal block boundary, wherein each 1-D central variance in a direction is a function of differences between the pixel and its neighboring pixels along that direction;

a pixel updater that modifies the characteristic value of the pixel proximate the horizontal block boundary using characteristic values of neighboring pixels substantially along the least central variance direction, to create a natural transition across the horizontal block boundary to essentially remove horizontal blocking artifacts resulting from said block-based transform coding.

23. The apparatus of claim 22, wherein:
the least variance direction detector: (i) determines 1-D central variance in the vertical direction across the horizontal block boundary, using neighboring pixels substantially along a vertical line centered at the current pixel; (ii) determines 1-D central variances in two diagonal directions across the horizontal block boundary, using neighboring pixels substantially along two diagonal lines centered at the current pixel, respectively; and (iii) selects the least central variance direction by finding the direction which has minimal 1-D central variance among the vertical and the two diagonal 1-D central variances; and
the pixel updater modifies the current pixel characteristic value as a function of the characteristic values of the neighboring pixels along the selected least central variance direction, to create a natural transition across the horizontal block boundary to essentially remove horizontal blocking artifacts resulting from said block-based transform coding.

24. The apparatus of claim 20, wherein:
the vertical block boundary processor determines an image feature direction across the vertical block boundary relative to the pixel, and modifies the pixel characteristic value substantially along the image feature direction; and
the vertical block boundary processor determines an image feature direction across the horizontal block boundary relative to the pixel, and modifies the pixel characteristic value substantially along the image feature direction.

25. The apparatus of claim 24, wherein the image feature comprises an edge.

* * * * *